Sept. 11, 1956　　　　　J. MARTIN　　　　　2,762,588
EJECTION SEAT AND PARACHUTE ASSEMBLY FOR A SINGLE PERSON
Filed Jan. 14, 1955　　　　　　　　　　　　4 Sheets-Sheet 1

Inventor
JAMES MARTIN
per Worth Wade
Attorney.

Sept. 11, 1956 J. MARTIN 2,762,588
EJECTION SEAT AND PARACHUTE ASSEMBLY FOR A SINGLE PERSON
Filed Jan. 14, 1955 4 Sheets-Sheet 2
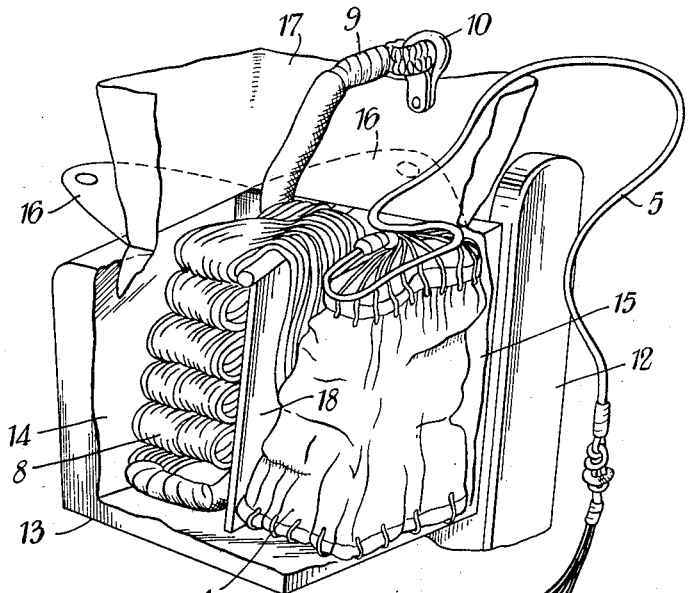
FIG. 2.
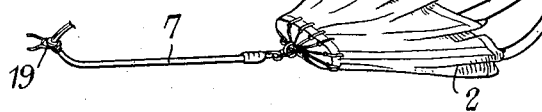
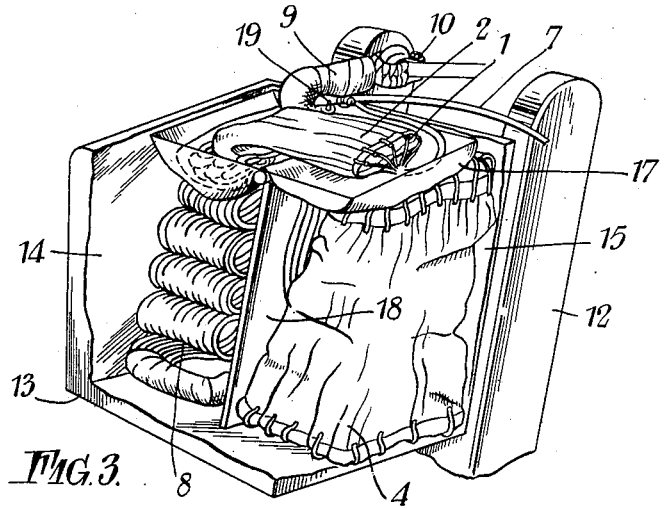
FIG. 3.
Inventor
JAMES MARTIN.
per Worth Wade
Attorney

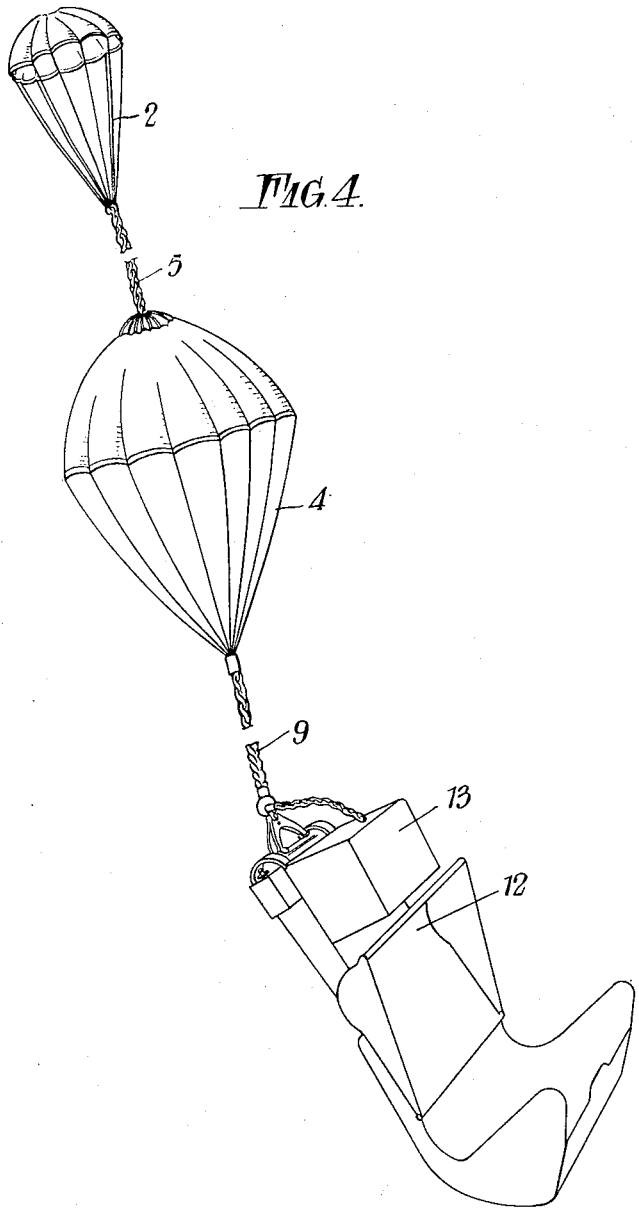

Sept. 11, 1956  J. MARTIN  2,762,588
EJECTION SEAT AND PARACHUTE ASSEMBLY FOR A SINGLE PERSON
Filed Jan. 14, 1955  4 Sheets-Sheet 4
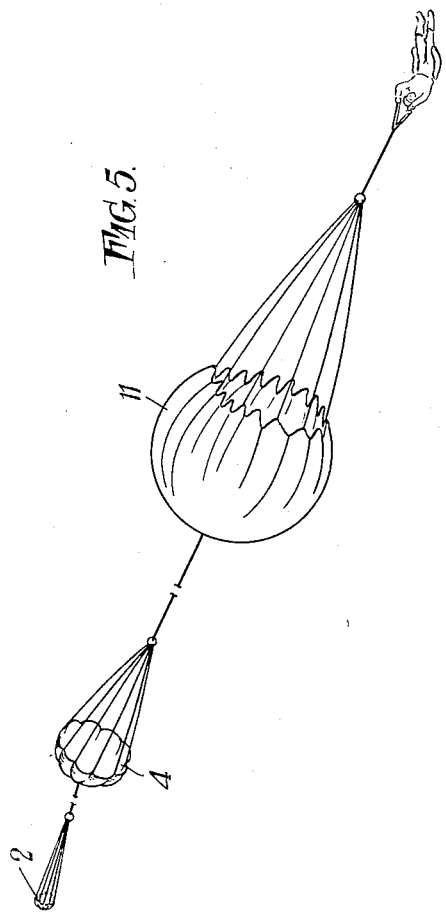
Inventor
JAMES MARTIN
per Worth Wade
Attorney.

United States Patent Office 2,762,588
Patented Sept. 11, 1956

2,762,588

EJECTION SEAT AND PARACHUTE ASSEMBLY FOR A SINGLE PERSON

James Martin, Denham, England

Application January 14, 1955, Serial No. 481,938

Claims priority, application Great Britain January 21, 1954

2 Claims. (Cl. 244—141)

The present invention is concerned with a method of deploying drogue parachutes for use with an ejection seat of an aircraft.

With ejection seats according to certain of our prior patents and patent applications (see for example Patents Nos. 2,569,638 and 2,638,294 and patent application Serial No. 305,951, now Patent No. 2,708,083, a drogue parachute is used, which normally is held to the seat, so that when the seat is clear of an aircraft, that is to say after ejection of the seat, it is stowed and steadied by deploying said drogue parachute, means being provided whereby after a predetermined time interval the drogue parachute in freed from the seat, the safety harness is released, the drogue parachute withdrawing the main or personal parachute so that this is deployed thus allowing an airman to make a normal descent on the personal parachute.

With a view to appreciating the aims of the present invention it can be said that it is generally necessary to delay the full development of the above mentioned drogue parachute until such time as the ejection seat is so positioned in the air, after ejection from an aircraft, so as to be in line, or substantially in line, with the line of flight, that is to say, the longitudinal axis of the seat should be horizontal, or substantially horizontal. It has been found that relatively considerable acceleration may be withstood by an airman when the axes of the seat and the drogue parachute are in line as above indicated.

The opening of the drogue parachute is to slow down the progress of the seat as quickly as possible, and to do this comparatively high loads are required. Now in practice if a sudden opening or full development of the drogue parachute, known as an explosive opening, is allowed, there is set up the danger that bursting of, or serious damage to, this drogue parachute, and also injury to the airman may result.

Amongst the objects of the present invention are to enable the high loads referred to above to be applied as gently as possible and to prevent the bursting of, or danger to, the drogue parachute due to an explosive opening, and also to avoid injury to an airman while at the same time the means employed to carry out the method according to the present invention are of a comparatively simple nature, not calling for any ancillary elaborate mechanism, yet providing a practical efficient method and means.

The drogue parachute referred to in the foregoing description is hereinafter termed the main drogue parachute.

The present invention comprises a pilot or primary drogue parachute permanently attached to the canopy of the main drogue parachute.

The pilot drogue parachute is relatively small in relation to the size of the main drogue parachute. As an example the pilot drogue parachute is 18 inches in diameter and the main drogue parachute 5 feet. Of course the difference in sizes would vary and be determined according to practical requirements.

A function of the pilot drogue parachute is to prevent an explosive opening of the main drogue parachute and also to allow the high loads required to be applied in a mild or moderate manner as opposed to a sudden application due to an explosive opening. The main drogue parachute performs a similar function for the canopy of the personal parachute. This is attained by reason of the combination of the pilot drogue parachute with the main drogue parachute, and the main drogue parachute with the personal parachute, whereby controlled and gradual openings of the main drogue parachute and the personal parachute are carried out, the pilot drogue parachute serving as a master control, and ensuring that the main drogue parachute does not become fully effective until after a predetermined period of time.

The pilot drogue parachute and the main drogue parachute are housed in a container, which may form the head rest of the ejection seat. As previously stated this pilot drogue parachute is permanently attached to the main drogue parachute.

The accompanying drawings illustrate an example of carrying into effect the invention.

In the drawings:

Fig. 2 is a perspective view of the container for holding the two parachutes, parts of the container being broken away for clearance of illustration, and with the pilot drogue parachute drawn out of the container.

Fig. 3 is a similar perspective view but shewing the two parachutes packed in their containers.

Fig. 4 is a diagrammatic view showing the two parachutes, before the main drogue parachute is disconnected from the seat.

Fig. 5 is a diagrammatic view shewing the line up of the pilot drogue parachute, the main drogue parachute, the personal parachute and an airman during a descent after he has left the seat.

Figure 1:
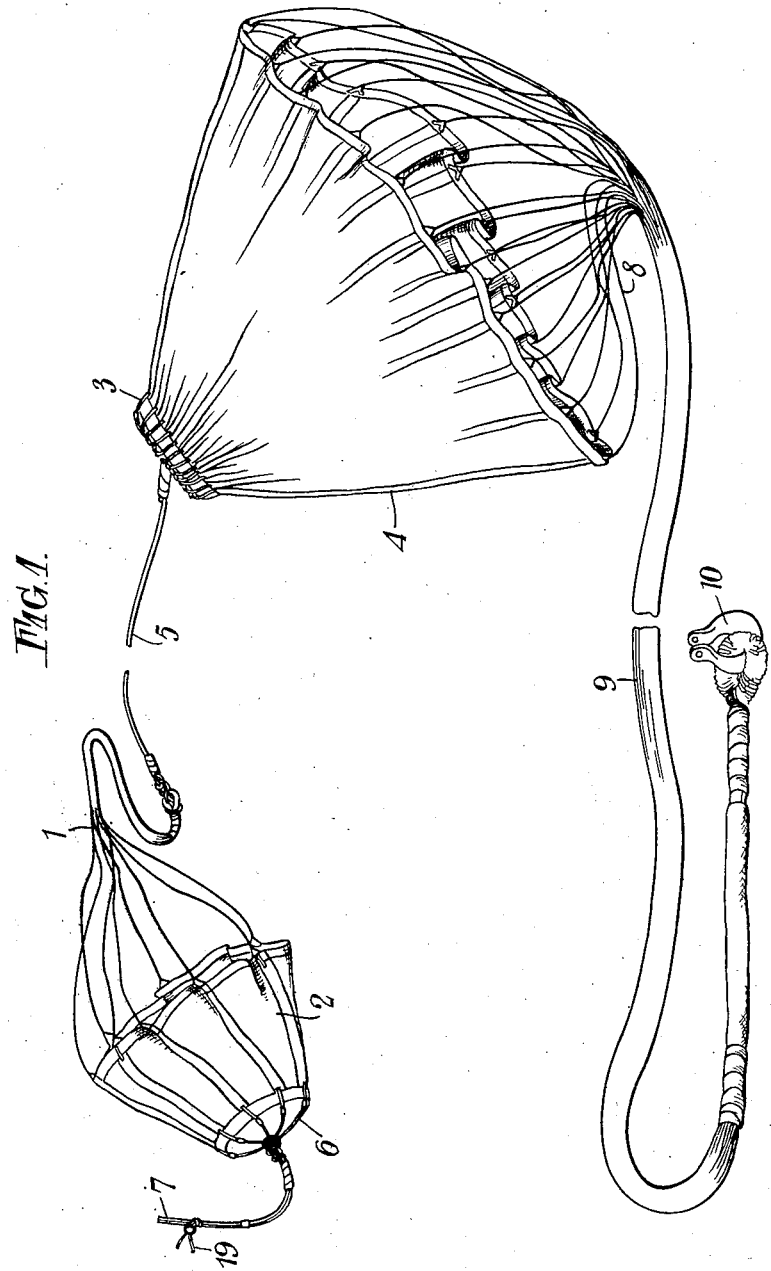
Fig. 1 is a perspective view shewing the pilot drogue parachute and the main drogue parachute.

Referring to the drawings. The shroud lines 1 of the pilot drogue parachute 2 is permanently attached to the crown 3 of the canopy of the main drogue parachute 4 by a withdrawal line 5. The crown 6 of the canopy of the pilot drogue parachute is connected by a withdrawal line 7 to the piston of a drogue gun located on the ejection seat and which is fired on ejection of the seat to withdraw the pilot drogue parachute from a container, which is described later. The drogue gun and the firing mechanism therefor form no part of the present invention.

The shroud lines 8 of the main drogue parachute 4 are united to form a line 9 which is attached to a shackle 10 which normally is in engagement with coupling means on the top beam or other suitable part of the ejection seat to hold the drogue parachute to the seat, but upon ejection of the seat and after a predetermined time interval the shackle is freed by the actuation of release mechanism so designed to disconnect automatically the shackle 10 from said coupling means. Here again the said coupling means and the release mechanism form no part of the present invention. One form of coupling means for engaging the shackle 10 consists of a scissors shackle as described in our pending patent application Serial No. 305,951, now Patent No. 2,708,083 which scissors shackle is normally locked so as to hold the shackle 10 to the seat, but when the release mechanism is actuated the scissors shackle is opened up and the shackle 10 released.

The line 9 is coupled to the top of a personal parachute 11 (see Fig. 5) so that there is a continuous coupling from the pilot drogue parachute to the top of the personal parachute. Various ways of doing this are described in our prior patent application Serial No. 305,951 and form no part of the present invention.

Figs. 2 and 3 illustrate one way of packing the pilot drogue parachute and the main drogue parachute in a single container which may form the head rest of the ejection seat 12.

The container 13 is divided into compartments 14 and 15, and has closure flaps 16 and a protective sleeve or flap 17. The shroud lines 8 are inserted in the compartment 14 and the main drogue parachute in the compartment 15, the shroud lines passing over a partition 18. The said shroud lines and the main drogue parachute are covered by the protective sleeve 17. The main drogue withdrawal line 5 emerges from the protective sleeve. This line 5 and the pilot drogue parachute 2 shroud lines 1 are folded on top of protective sleeve 17 on the compartment 15, and the pilot drogue parachute 2 placed as shown in Fig. 3. The closure flaps are then closed. These flaps are held in the closed position by any suitable fastening device which can be automatically released when the pilot drogue parachute is withdrawn by the firing of the drogue gun, for example by a flap securing pin 19 on the line 7. The pilot drogue withdrawal line 7 emerges from the container and as previously stated is connected to the piston of the drogue gun.

Fig. 4 shews the pilot drogue parachute and the main drogue parachute both deployed with the main drogue parachute still connected to the ejection seat.

Fig. 5 shews the line up of the pilot drogue parachute, the main drogue parachute, the personal parachute and an airman during a descent after he has left the seat.

Now assuming that a seat has been ejected from an aircraft. The pilot drogue parachute, after being withdrawn from the container, first of all starts to rotate or swing the ejection seat from a vertical position, or a substantially vertical position, relatively to the line of flight of an aircraft, to a horizontal position or a substantially horizontal position. Secondly it withdraws the main drogue parachute from its housing and thereafter continues to control this main drogue parachute in such a manner as to prevent an explosive opening so that the high loads required to slow down the progress of the seat are applied in a mild or moderate manner as opposed to a sudden application due to an explosive opening. The subsequent release of the main drogue parachute from the seat and the withdrawal of the personal parachute form no part of the present invention.

It will be apparent that the invention can be modified and changed within the scope of the appended claims.

I claim:

1. In an ejection seat for aircraft having a main drogue parachute normally held to the seat but which is freed on the ejection of the seat from the aircraft, the combination comprising a pilot drogue parachute permanently coupled to said main drogue parachute, a personal parachute attached to the pilot, said personal parachute being permanently coupled to the main drogue parachute, the whole providing a continuous coupling from said pilot drogue parachute to the personal parachute throughout the descent of the pilot by the personal parachute after leaving the seat, a comparted container forming the head rest of the seat, one compartment housing the main drogue parachute, and the other compartment the shroud lines thereof, a protective sleeve covering said compartments, and releasable closure flaps for said container, the pilot drogue parachute being housed between the sleeve and the closure flaps, the said pilot drogue parachute serving as a master control for the gradual opening of the parachutes in sequent order.

2. In a personal ejection seat for aircraft, the combination of, an ejection seat for a single person, a container positioned on the top of said seat and adapted to serve as a head rest, a relatively small pilot drogue parachute, a relatively large main drogue parachute connected through its crown to the shrouds of the pilot drogue parachute, a personal parachute connected through its crown to the shrouds of said main drogue parachute and a shackle attached to the shrouds of said main drogue parachute and adapted to be releasably attached to said ejection seat, the pilot drogue parachute and the main drogue parachute being housed in said container, the pilot drogue parachute serving to prevent explosive opening of said main drogue parachute and to deploy the ejection seat from a substantially vertical to a substantially horizontal position before release of said seat.

References Cited in the file of this patent

UNITED STATES PATENTS

| 1,445,293 | Calthrop | Feb. 13, 1923 |
| 1,470,610 | Holt | Oct. 16, 1923 |
| 2,502,470 | Martin | Apr. 4, 1950 |
| 2,569,638 | Martin | Oct. 2, 1951 |

FOREIGN PATENTS

| 699,290 | Great Britain | Nov. 4, 1953 |